United States Patent Office 3,513,812
Patented May 26, 1970

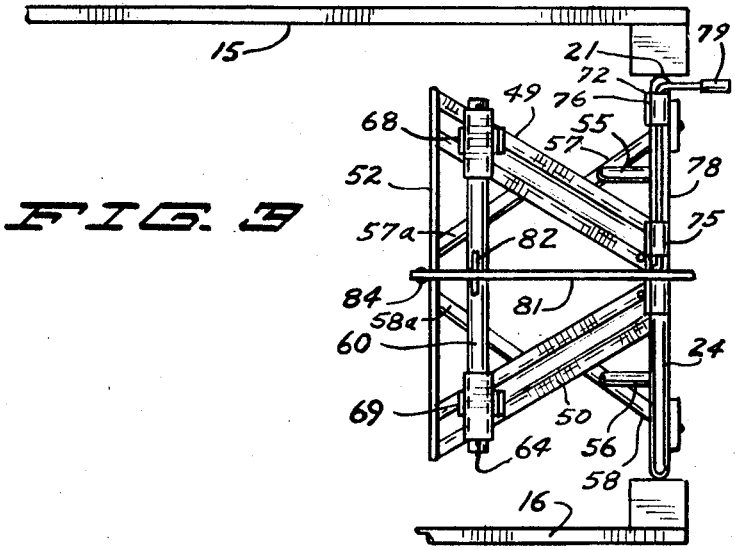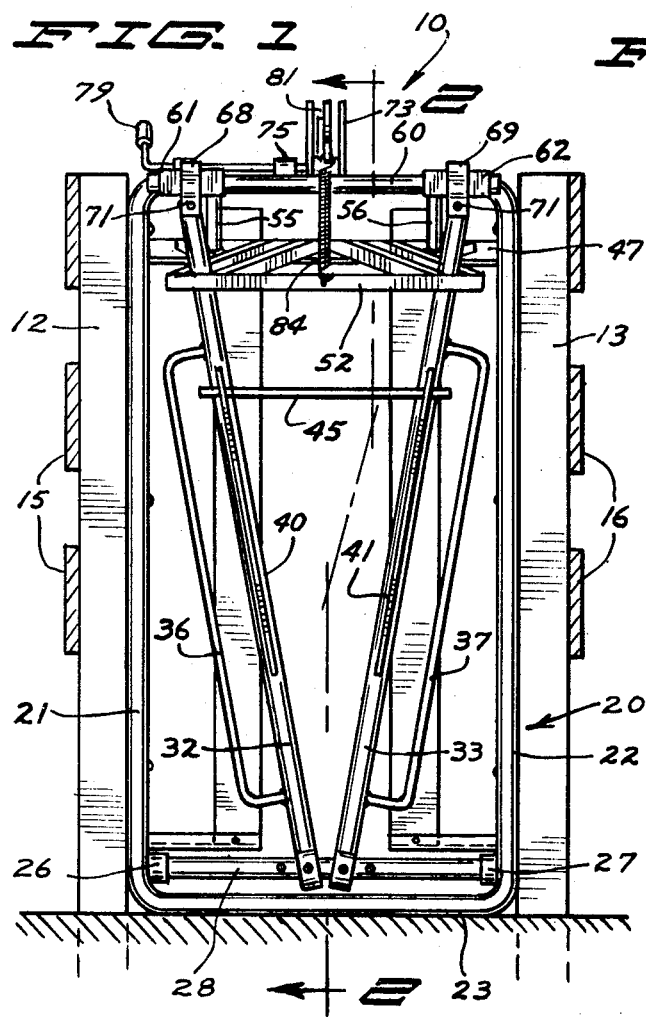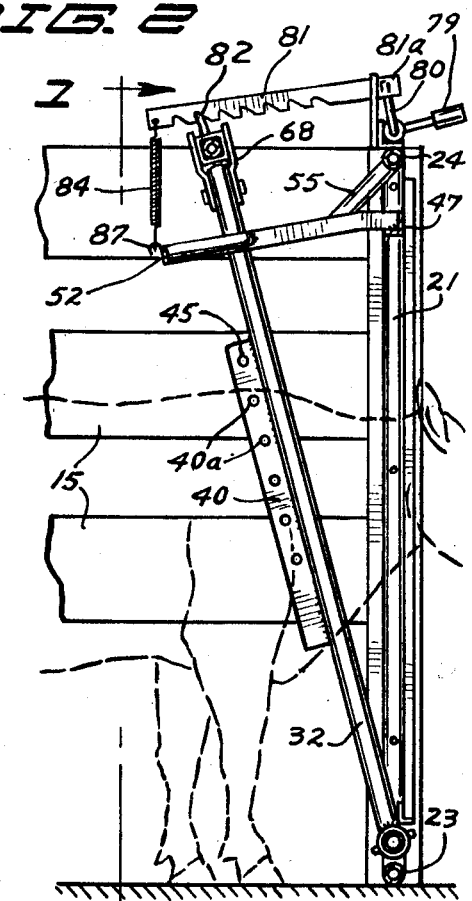

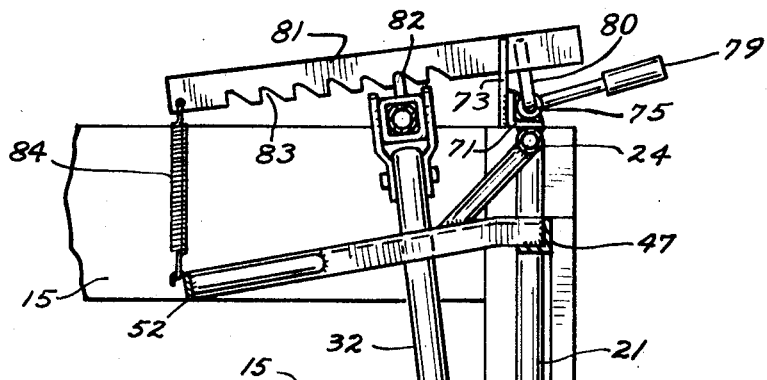
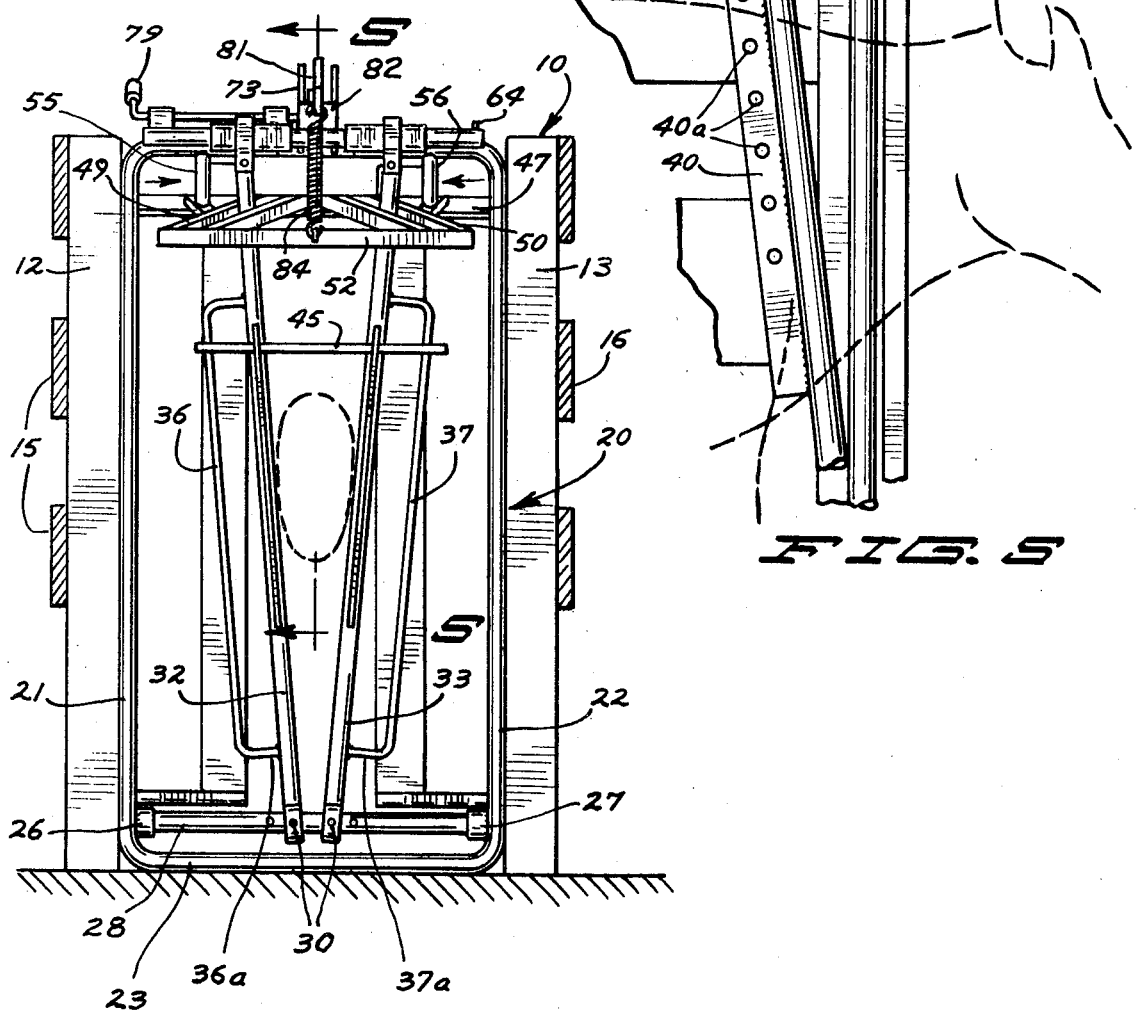

3,513,812
SELF-LOCKING LIVESTOCK HEAD GATE
STRUCTURE
David H. Iverson, Bristol, S. Dak. 57219; Dayton A.
Krueger, Stratford, S. Dak. 57474; and James R.
Krueger, Verdon, S. Dak. 57478
Filed Aug. 1, 1968, Ser. No. 749,487
Int. Cl. A61d 3/00
U.S. Cl. 119—98                                  7 Claims

ABSTRACT OF THE DISCLOSURE

A self-locking livestock head gate consisting of a stanchion having closely spaced head locking members pivoted for forward tilting converging movement caused by movement of an animal, overhead rails guiding said locking members and an overhead ratchet member releasably securing said locking members in converged condition against the withdrawal of an animal therefrom.

BACKGROUND AND SUMMARY OF THE INVENTION

Restraining structures are frequently used in connection with animals such as livestock, particularly for treatment. Stock chutes are in common use for such purpose and means are used in connection with chutes to secure the head of an animal. Such means are commonly referred to as head gates and generally require manual operation by one person while another person urges the animal into the head gate. It is desirable to have a self-locking head gate structure operated by movement of an animal.

The subject matter of the invention herein relates to a head gate structure which is arranged and constructed to automatically engage and lock the head portion of an animal against withdrawal therefrom.

Generally described, the invention herein comprises an end section of a chute formed on the order of a stanchion including a pair of head locking bars having adjacent lower end portions secured for transverse pivotal movement thereof and for limited forward and rearward tilting movement thereof, overhead guide rails cause said locking bars to diverge upwardly upon being tilted rearwardly and to converge to a head locking position upon being tilted forwardly and a ratchet bar automatically securing said locking bars in their progressively converging positions as they are tilted forwardly.

It is an object of this invention to provide a self-locking head gate of simple construction to receive and hold an animal in locking position.

It is another object of this invention to provide a livestock head gate which is self operated by the movement of an animal being received between the locking bars of the structure.

It is more specifically an object of this invention to provide a livestock head gate comprising head locking members spaced apart to conveniently receive the head portion of an animal, which members converge responsive to the movement of the animal in moving said members forwardly in advancing into the gate and which members self-lock against the withdrawal of the animal.

These and other objects and advantages of the invention will be set forth in the following description made in connection with the accompanying drawings in which like reference characters refer to similar parts throughout the several views and in which—

FIG. 1 is a view in rear elevation taken on line 1—1 of FIG. 2, as indicated, with some portions thereof being shown in section;

FIG. 2 is a view in vertical cross section taken on line 2—2 of FIG. 1 as indicated, with portions thereof being broken away;

FIG. 3 is a top plan view;

FIG. 4 is a view similar to FIG. 1, with portions thereof being shown in an alternate position; and FIG. 5 is a view in vertical section taken on line 5—5 of FIG. 4 as indicated, with portions thereof being broken away.

DESCRIPTION OF A PREFERRED EMBODIMENT

Referring to the drawings, a terminal portion of a conventional type of a livestock chute is shown and is indicated generally by the reference numeral 10. Said chute comprises upright frame members 12 and 13, respectively, supporting spaced horizontal side boards 15 and 16.

Disposed between said upright frame members and suitably secured thereto as by bolts, is a substantially rectangular tubular main frame member 20 having side members 21 and 22, a bottom member 23 and a top member 24. Secured to the inner sides of said side members adjacent the bottoms thereof are a pair of conventional cup bearings 26 and 27 having a tubular rotatable supporting member 28 extending therebetween and having its ends journaled therein.

Upstanding from said support member 28 and having their lower ends respectively pivoted thereto as by bolts 30, are upright bars 32 and 33 comprising locking members. Said locking members extend upwardly substantially to the height of the upper portion of said main frame 20. Said supporting member 28 may have a plurality of spaced apertures therethrough for the adjustment of the spacing between the lower ends of the locking members 32 and 33.

Extending outwardly laterally from the remote sides of said bars 32 and 33 with respect to one another are rails 36 and 37 respectively having angled leg portions 36a and 37a secured to said bars 32 and 33 as by welding. Said rails 36 and 37 extend for a substantial portion of the lengths of said bars 32 and 33 and serve as guard rails.

Extending rearwardly of said bars 32 and 33 in substantially parallel relation to one another are a pair of elongated plate members 40 and 41. Each of said plate members has a plurality of spaced apertures such as the aperture 40a of said plate member 40. A rod 45 will be disposed horizontally through opposing pairs of said apertures at an appropriate height to limit the upward movement of the head of an animal.

Extending between said side members 21 and 22 adjacent the upper portions thereof and suitably secured thereto as by welding, is a bar 47. Secured to said bar centrally thereof and extending therefrom in a direction inwardly of said chute 10 are a pair of overhead guide members 49 and 50 and here shown as vertically slotted guide rails diverging laterally from one another in the form of a V and having a bar 52 extending across their free ends secured thereto. Said guide members 49 and 50 respectively have the upper portions of said bars 32 and 33 extending therethrough whereby as said bars are moved inwardly or rearwardly of said chute they diverge and as they are moved forwardly in the direction of the frame 20 they converge.

A pair of depending bracing rods 55 and 56 are shown extending from said top member 24 to a welded engagement with horizontal angled bracing members 57 and 58 extending between the bar 47 and the guide rails 49 and 50. Bracing members 57a and 58a extend between said guide rails and the bar 52, as illustrated in FIG. 3.

A bar 60 is provided having sliding collars 61 and 62 thereon with retainer pins 64 extending through the end portions of said bar. Said collars respectively have bifurcated or split clamps 68 and 69 respectively having pivoted thereto my pins or bolts 71 the upper end portions of said bars 32 and 33.

Seated on the top frame member 24 centrally thereof and adjacent the end thereof, as shown in FIG. 3, are relatively short angle brackets 71 and 72. The bracket 71 has upstanding therefrom a U guide member 73. Carried by said brackets are cylindrical bearings 75 and 76. Journaled in said bearings and extending therethrough is a rod 78 having an angled outer free end portion forming a lever arm 79. At the inner end of said bar outwardly of said bearing 76 and centrally of said U member 73 is an arm portion 80 shown here disposed substantially at a right angle with respect to said arm 79.

A ratchet bar 81 is provided having ratchet teeth 83 formed in the lower edge portion thereof to engage a keeper or pawl 82 upstanding centrally from the central portion of the bar 60.

Said ratchet bar at its end portion 81a is secured as by welding to said angled arm 80 and said bar extends rearwardly therefrom to be substantially coextensive with the guide rails 49 and 50. Thus said rod 78 forms a ratchet arm releasing member.

A coiled spring 84 is secured at one end to the extended free end of said ratchet bar 81 and said spring is secured at its other end to a hook 87 carried centrally of said bar 52.

The ratchet teeth are angled in the direction of said frame member 20 whereby said pawl moves freely in the direction for coverging the locking bars 32 and 33. The pawl is released when the ratchet bar is tilted upwardly against the tension of the spring 84 by a downward movement of the lever arm 79.

OPERATION

In commencing to use the head gate above described, the operator will lower the lever arm 79 to release the pawl 85 from the ratchet bar 82 and the bars 32 and 33 will be moved inwardly of the chute 10 to a diverging position by means of said diverging guide rails 49 and 50.

An animal will be moved along the chute 10 in the direction of said head gate. Said head gate will normally be located at the outer end of a chute.

As the animal moves forwardly, his head will be disposed between the bars 32 and 33, there being no other place open of sufficient size to receive the head, and the animal with its shoulders will move the bars 32 and 33 forwardly to converge the same. With the forward movement of the bars 32 and 33, the pawl 85 advances along the toothed portion of the ratchet bar 82 in locking positions. The animal will move the bars 32 and 33 forwardly until either the bars are stopped upon engagement with the inner ends of the guide rails 49 and 50 or at the point where the bars converge upon the neck of the animal in sufficiently firm locking position to stop the forward movement of the animal. At such a point the animal will be locked in position and will be unable to withdraw its head from locking engagement between the bars 32 and 33.

A rod 45 will be disposed between the plate members 40 and 41 to limit the upward movement of the head of the animal.

Thus the animal in effect operates the head gate structure in connection with the self-locking mechanism comprising the ratchet bar 82 as described. The locking members have unobstructed converging movement with an automatic locking mechanism which subject to a releasing means obstructs the diverging movement of said locking members.

The lower end portions of the bars 32 and 33 may be adjustably spaced apart as may be desired.

Thus it is seen that there has been provided a simply constructed self-locking head gate structure which by means of the action of the animal itself serves to engage and hold the animal in a locked position.

What is claimed is:

1. A self-locking livestock head gate in connection with a livestock chute having in combination,
a vertically disposed frame in operating association with said chute,
a pair of upstanding locking members,
rotatable supporting means in connection with said locking members adjacent the bottom of said frame,
said locking members being pivoted adjacent their lower ends to said supporting means for pivotal upwardly diverging separation and being movable with said means for tilting movement toward and away from said frame,
a pair of overhead guide members extending in diverging relationship from said frame in the direction of said locking members and being disposed to receive the upper end portions of said locking members,
means slidably connecting the respctive upper end portions of said locking members, and
means carried by said frame being arranged and constructed to releasably engage said locking members for unobstructed converging movement of said locking members in the direction of said frame and for obstructed diverging movement of said locking members in the direction away from said frame.

2. The structure set forth in claim 1, wherein
a pawl is carried by said second mentioned means, and said last mentioned means comprises
a ratchet arm carried by said frame to be substantially coextensive with said guide members;
means in connection with said guide members resiliently holding said ratchet arm into operating engagement with said pawl, and
means in connection with said ratchet arm disengaging the same from engagement with said pawl.

3. The structure set forth in claim 2, wherein
said last mentioned means comprises a rod rotatably carried by said frame member,
one end portion of said rod is angled to form a lever arm,
the other end portion of said rod is angled and secured to one end portion of said ratchet arm whereby rotational movement of said rod disengages said ratchet arm from engagement with said pawl.

4. The structure set forth in claim 1, wherein
said rotatable supporting means comprises an elongated tubular member having its end portions respectively journaled in the adjacent side portions of said frame.

5. The structure set forth in claim 1, including
a pair of elongated plate members respectively carried by said locking members in parallel relationship to one another,
said plate members respectively having aligned apertures, and
a rod disposable through aligned pairs of said apertures to limit the upward movement of the head of an animal engaged by said locking members.

6. The structure set forth in claim 1. wherein said guide members respectively comprise spaced pairs of frame members each having a vertical slot therebetween to have the upper portions of said locking members extend therethrough.

7. The structure set forth in claim 1, wherein said second mentioned means comprises a bar extending across the upper end portions of said locking members, a pair of sliding members carried on said bar, and means securing a sliding member to each of said upper end portions of said locking members.

References Cited

UNITED STATES PATENTS

| | | | |
|---|---|---|---|
| 1,513,336 | 10/1924 | Mayes | 119—98 |
| 3,043,269 | 7/1962 | Kausche | 119—98 |

HUGH R. CHAMBLEE, Primary Examiner